United States Patent Office 3,331,798
Patented July 18, 1967

3,331,798
VISCOUS AQUEOUS BLEND OF POLYSTYRENE SULFONATE AND N-VINYLPYRROLIDINONE, AND PREPARATION THEREOF
Billy B. Hibbard, Midland, Mich., assignor to The Dow Chemical Company, Midland, Mich., a corporation of Delaware
No Drawing. Filed Jan. 8, 1962, Ser. No. 164,963
3 Claims. (Cl. 260—29.6)

The present application is a continuation-in-part of my application Ser. No. 55,156 filed Sept. 12, 1960, and now abandoned.

The present invention is concerned with control of the physical properties of aqueous compositions, and is more particularly directed to materials and processes for the preparation of aqueous substances of controlled viscosity.

Of all the liquid media in which substances are dispersed for the more ready achievement or distribution of mechanical, chemical, or biological activity, water is the least expensive and most common. However, when substances are dispersed in water, they usually either dissolve and form a solution of which the viscosity is essentially the same as that of water, or become suspended, temporarily or permanently, in the aqueous medium with the result that the suspension becomes essentially a mass of solid particles possessing their own properties but disposed within water of essentially unincreased viscosity. In many applications, an aqueous medium is of greatly improved utility if its viscosity be simply increased. Such increase, however, must be controllable in the sense that approximately the desired degree of viscosity is established. Moreover, ideally, agents used to increase or control viscosity of fluid preparations should, themselves, be practically inert as to the desired activity of the resulting viscous preparation: that is to say, they should contribute almost nothing but viscosity and should contribute this under virtually all circumstances, and the viscous products should be stable in storage.

Viscous aqueous preparations have numerous uses. For example, water alone, being rendered of high viscosity by the addition thereto of a minor amount of a viscosity increasing substance, becomes a very much more effective agent in such applications as fire-fighting. Also, such viscous inert aqueous preparation is of improved value in the shipment of plant nursery stock whereof it is desired that the roots and other parts of living plants be maintained in a moist condition throughout the period of storage and shipment, until such plants are again established in soil. Whereas water tends to be lost by flowing or dripping away and by evaporation, when the roots and other parts of plants are moistened with a heavy viscous water gel, otherwise inert or at least harmless as to the growth of the plants, they may readily be maintained in moist condition over much longer periods of time and with much less attention than when water alone is used.

In the pharmaceutical and cosmetic fields, it is often desired to apply a pharmaceutical substance or a cosmetic adjuvant as an aqueous preparation; such employment has frequently been hindered because aqueous preparations promptly evaporate to dryness and because it is impractical to build up a deposit of significant depth therefrom. However, by the employment of pharmaceutical and cosmetic substances comprising aqueous preparations together with minor amounts of viscosity-building agents, it is possible to exhibit such substances as pastes, gels, and the like, with correspondingly longer persistence of desired action. In numerous industrial and technological processes, including those wherein the employment of unmoving water is especially indicated by reason of its high specific heat, the employment of thickened or viscosity-increased aqueous preparations frequently permits ready achievement of beneficial results not otherwise available.

Accordingly, it is an object of the present invention to provide means for increasing, to a desired degree, the viscosity of aqueous preparations. It is a further object of the present invention to increase the viscosity of aqueous preparations without significantly affecting other desired utilities and properties of such aqueous preparations.

It is another object of the present invention to provide a novel and economical aqueous vehicle of which the viscosity may be varied between a viscosity almost as low as that of water and a viscosity greater than can readily be measured, that is to say, a near solid. It is a further object to provide novel aqueous pharmaceutical preparations of pre-determined viscosity up to the viscosity of firm gels, embodying pharmaceutical agents normally liquid. It is a further object to provide novel aqueous cosmetic substances and cosmetic adjuvants of desired viscosities up to the viscosity of firm gels, of cosmetic substances and cosmetic adjuvants which are normally liquid. These and other objects will be apparent from the following specification.

According to the present invention I have discovered a viscous, difficultly flowable essentially aqueous composition of which the components comprise at least a water-soluble polymeric N-alkenyl pyrrolidinone compound and a water-soluble organic polyalkenyl polymer comprising, when the said composition is in the pH range of about 1.5 to 12.5, recurring moieties which are members of the group consisting of sulfo and the soluble salts thereof; and in the pH range of about 6 to 12.5, carboxyl and the soluble salts thereof.

The exact chemical structure of the present viscous compositions, and whether a chemical reaction of any sort takes place in their formation, is not known. However, a preparation of the present invention is a composition of which the essential components in aqueous dispersion are a water-soluble polymer comprising recurring N-alkylene pyrrolidinone groups and a water-soluble polyalkenyl polymer comprising, when the composition has a pH in the range of about 1.5 to 12.5, recurring members of the group consisting of sulfo and soluble salts thereof; and when the composition has a pH in the range of about 6 to 12.5, carboxyl and soluble salts thereof; the said composition being of viscosity greater than the mean of the separate viscosities of separate similar dispersions of the said polymers.

Suitable pyrrolidinone substances to be employed as one of the two dissimilar components of the novel viscous materials are prepared by, for example, the method of U.S. Patent 2,265,450. For maximum viscosity increase the water-soluble pyrrolidinone polymer should, as a preferred starting material, have a K-value of about 30 and a molecular weight as determined in a standard light-scattering technique of about 150,000.

Polymeric substances comprising recurring acidic moieties and their derivatives of the sort described which are representative of other of the two dissimilar members of the present vehicle substances include polystyrene-p-sulfonic acid, polyvinylsulfonic acid, polyacrylic acid, sodium polyacrylate, copolymers comprising maleic anhydride hydrolyzed after polymerization, polyvinylbenzoic acid and substituted benzoic acid, partially hydrolyzed polyacrylamide, a hydrolyzed copolymer of vinylacetate and maleic anhydride, a copolymer of styrene and maleic anhydride partially hydrolyzed and thereafter neutralized with sodium hydroxide, a product prepared by the polymerization of styrene and subsequent ring sulfonation to the extent of about 70 mole percent of monomer; and copolymeric substances wherein there recur moieties derived from inclusion, in the mixture of monomers, of one or more of styrenesulfonic acid, vinylsulfonic acid, acrylic acid, methacrylic acid, vinylbenzoic acid, ring-substituted vinylbenzoic acid, acrylamide, ethacrylic acid, and its higher homologues, and maleic anhydride in copolymers which are hydrolyzed subsequent to polymerization; and in each case, the salts including the alkali metal salts, ammonium salts, amine salts, and particularly the lower alkylamine and lower alkanolamine salts of the acidic substances of the sort described. Substances containing such acidic groups are sometimes reacted with polybasic or polyhydroxy substances to obtain condensation polymers. Because these have neither the free acid nor its salt as a component; they are inoperative in the present invention. Adjustment of the pH of a solution of an employed acidic polymer is carried out by the use of any convenient acidifying or alkalizing material subject to the sole limitation that it not precipitate any component of a solution to which it is added. Very suitable and useful acidifying materials include hydrochloric, acetic, chloroacetic, formic, propionic, sulfuric, phosphoric and like acids. Suitable and useful alkalizing materials include gaseous and aqueous ammonia, ammonium carbonate, the carbonates, bicarbonates and hydroxides of the alkali metals such as sodium, potassium, and lithium and in particular sodium hydroxide, which is excellent and inexpensive.

Good viscosity increase results, and highly versatile products are formed when contacting in water solutions a water-soluble polymeric N-vinylpyrrolidinone and a water-soluble polyalkenyl substance upon the polymer chain of which in an aqueous mixture having a pH of about 1.5 to 12.5, there are recurring moieties which are members of the group consisting of sulfo and the salts thereof, and in aqueous mixture having a pH of about 6 to 12.5 there are moieties that are members of the group consisting of carboxyl and salts thereof, said composition being of greater viscosity than the mean of the separate viscosities of the said polymers in separate similar dispersion.

In one manner of carrying out the preparation of the simple viscous aqueous preparation of the present invention, stable homogeneous aqueous dispersions which may commonly be called solutions, of each of the two said kinds of polymers, (that is, the polyvinyl pyrrolidinone polymer and the acid or salt bearing polymer) are first prepared. In this connection it is noted that most such solutions of water-soluble polymers exhibit viscosity moderately higher than the viscosity of water alone. This viscosity, however, is not the thickening or viscosity-building effect of the present invention.

The two separate such aqueous polymer solutions are then combined. The combining is carried out by any convenient means whereby one aqueous solution may be contacted with another. When it is desired to utilize fully the dissolved solids of each of the two said solutions, and to prepare a homogeneous thickened preparation, the combining is carried out in such manner as to provide intimate contact between the two said solutions. This may readily be effected by intimately mixing and stirring the solutions together, preferably with relatively gentle mechanical action. The viscosity that is characteristic of the compositions of the present invention develops promptly after the mixing of the starting materials. Usually, an initial brief interval of low viscosity permits thorough mixing of the starting materials, if such mixing be done promptly. However, if such mixing be carried out violently and past the time when the resulting viscosity has risen to its maximum, the resulting product appears to pass its peak viscosity and decline somewhat in viscosity.

One means of combining starting materials involves the commingling of streams which may be streams issuing from nozzles, whether as solid streams or finely dispersed sprays comprising minute droplets of each separate starting aqueous solution.

When the commingling of such sprays or other stirring procedure is carried out in gaseous atmospheres such as air, the resulting viscous product tends to entrap inclusions of such gaseous atmosphere. Therefore, when it is desired to prepare such heavy, viscous or near-solid medium without entrapped gas, combining of the starting materials may advantageously be carried out gently: or under atmospheres of reduced pressure or in the absence of gaseous atmosphere. When such gas content is desired, gas may be introduced under pressure to one or both starting materials or to the resulting product. The result is an aerated or foamed gel.

In an alternative method of preparation, a thin surficial deposit of one aqueous starting solution is first deposited from a fixed orifice upon the surface of a rotating drum and a similar thin deposit of a second such starting material is applied thereto at a point adjacent to the point at which the first such solution was so deposited and, as the drum rotates, it carries the resulting film of high viscosity past a blade or scraper whereby the resulting viscous vehicle deposit is removed.

In a general method of preparation in which it is possible to prepare all the vehicle compositions of the present invention, one of the two dissimilar aqueous starting solutions is poured, with prompt stirring, into a container containing the other of the two dissimilar starting solutions, such container having a capacity adequate to hold the combined result, stirring being continued only long enough to effect complete dispersion of each such aqueous preparation in the other. This method is well adapted to be employed in the preparation of all the vehicles of the present invention of low to moderate viscosity and, without undue difficulty, may be used in the preparation of even the most viscous vehicles of the present invention.

The starting material solutions of the sort described may also each be brought separately through hose, tube, pipe, or conduit to a junction or confluence at and beyond which mixing takes place or is caused, by inducel turbulence, to take place, and the resulting viscous product is then further disposed in any desired manner.

The aqueous starting solutions may comprise pharmaceutical or cosmetic substances, chemically, biologically, or physically active substances, or stable aqueous dispersions of such substances in water-compatible form such as solutions in water-miscible solvent or dispersion in stable aqueous emulsion.

When one or both of the said aqueous polymer solutions comprises such active substance, the said substance becomes embodied in the resulting thickened or viscous preparation.

There is also prepared a composition of matter comprising the product resulting from the intimate mixing together in aqueous dispersion of an adduct of a polymeric vinyl pyrrolidinone compound and a biologically active material with a polyalkenyl substance comprising, when the pH thereof is in the range of from about 1.5 to 12.5, recurring moieties selected from sulfo and soluble salts thereof, and when the pH thereof is in the range of from about 6 to 12.5, recurring moieties selected from carboxyl and soluble salts thereof.

Although the uncombined starting solutions to be employed in the present method of preparing a viscous product of the present invention may be heated at any temperature over the liquid range of water, that is, between 0° C. and 100° C. without injury, the resulting viscous preparations tend to be somewhat heat sensitive. This heat sensitivity does not appear to exhibit sharply defined limits. Between about 0° C. and approximately 20° C., temperature changes have little or no effect upon the present viscous product. Between about 20° C. and about 50° C. increasing temperatures are accompanied by gradual decrease in viscosity, and the full original viscosity as measured at about 20° C. is largely recovered as the product is cooled. As the temperature of a viscous product of the present invention is increased gradually from about 50° C. to about 70° C., the viscosity further declines, but again most of it is recovered upon cooling. Similarly, as heating is continued to approximately the boiling temperature of water, viscosity of the present products further declines rapidly, but almost all of the viscosity is recovered upon cooling. However, at temperatures only slightly lower than the boiling temperature of water, the present products yet retain a viscosity substantially higher than the average of the viscosities of the starting material at the same temperatures. Exact numerical values for such declining viscosities can be ascertained only in the instance of particular compositions and treatments, and vary according to factors not yet completely known. No quantitative means of predicting such thermal viscosity change in advance is now known. Preparation of the present products is best carried out with both aqueous solutions at any temperature at the lower end of the temperature range at which the starting polymeric substances are conveniently dissolved in water in the desired starting concentration. Such temperatures usually are room temperature, about 24° C.; or the temperature of industrial process feed-water, usually from about 7° C. to about 22° C. However, when it is desired to employ distilled or heat-sterilized water in the preparation of the starting aqueous solutions, aqueous still-condensate may be employed at any temperature at which it is conveniently collected, assuming the starting polymeric substance to be soluble in water at such temperature. The resulting hot solutions need not be cooled before continuing to prepare the present products.

The exact concentration of aqueous solution of starting polymeric substances depends upon various factors and may vary over a considerable range. When it is desired to prepare a vehicle of which the viscosity or "thickness" will develop precisely within narrow limits, it may be necessary, in any individual preparation, to carry out simple range-finding tests. Thus, the desired viscosity of the resulting product is a major factor in the determination of the concentration in aqueous solutions of the starting polymeric substances: the achievement of any viscosity desired between that of water and that of a substance so viscous as to be impossible to determine by conventional means, is not difficult.

In a second general manner of practicing the present invention, a viscous product is prepared by dispersing in aqueous medium of appropriate pH the essentially dry product resulting from the intimate mixing and blending together in finely-divided form of a water soluble polymeric N-alkenyl pyrrolidinone and a water-soluble polyalkenyl substance comprising recurring moieties which are members of the group consisting of sulfo and the salts thereof: an appropriate pH being from about 1.5 to 12.5 when employing a sulfo compound, as described and from about 6 to 12.5 when employing a carboxyl compound, as described.

Numerous methods for effecting such mixing and blending are well known to those skilled in the art, one representative method being the use of a ball-mill.

In a typical manner of carrying out such preparation, the said polymeric substances are combined in the desired proportion, usually in the absence of liquid medium, and are then intimately mixed and blended together to effect uniformity of the resulting mixture.

Such uniform resulting mixture is then dispersed or dissolved in water to obtain a homogeneous uniform aqueous dispersion which promptly assumes the viscosity of the product of the present invention.

No theoretical explanation is known, for the viscosity increase of the present invention. Therefore, it is not at present possible to state precisely what proportions of the two solid components of the resulting viscous material represents the optimum of efficiency and economy.

Good results are obtained when employing amounts of the solid materials in which the number of recurring pyrrolidinone moieties is equal with the number of recurring acid moieties; apparently equally good results are also obtained when employing equal actual weights of the two different kinds of substances, at least when each is a homopolymer. However, good results are obtained when employing the starting polymeric materials in very dissimilar amounts. The identities of the starting materials and the method of their use being known, those skilled in the chemical arts will readily be able to achieve any desired viscosity.

For example, when employing starting polymer solutions each in a concentration of ½ percent solid by weight of resulting solution, good thickening and a very substantial increase over the viscosity of the starting materials is obtained when employing a mixture comprising 1 part of sodium polystyrene sulfonate solution and 9 parts of polymeric N-vinylpyrrolidinone solution. Similarly, a mixture comprising 9 parts of sodium polystyrene sulfonate solution and 1 part of polymeric N-vinylpyrrolidinone gives a distinctly thickened resulting product.

When employing the said ½ weight percent solutions of the said starting materials, maximum thickening appears to be achieved when employing approximately 25 parts of polymeric N-vinylpyrrolidinone and approximately 75 parts of sodium polystyrene sulfonate solution. Such proportion is not, however, critical or essential for the practice of the present invention.

The viscosity of the resulting products of the present invention appears to be related in some way which is not fully understood to the concentration of the starting materials in aqueous dispersion. No particular amount or concentration or related ratio of amounts or concentrations of the polymeric substances in aqueous dispersion is known or believed to be essential or critical, but good results are obtained when employing starting solutions containing ten weight percent of each substance. The resulting products commonly achieve a viscosity so great as to be practically solids. When it is desired to prepare substances of considerably less viscosity, concentrations of one weight percent of each of the starting polymeric substances in water are usefully employed. The resulting products appear to be soft solids or near-solids.

When it is desired to prepare an aqueous composition of which the essential components are a mobile aqueous solution of a polymeric N-vinylpyrrolidinone and a polyalkenyl polymer upon which there are recurring moieties which are members of the group consisting of sulfo and carboxyl and salts thereof, the polyalkenyl polymer being employed at a suitable pH, the resulting composition having a viscosity greater than the mean of the separate viscosities of similar separate solutions of the said polymers, but yet a relatively low viscosity, concentration of solids as low as 5 one-hundreths of 1 percent in the prepared aqueous starting material solution may be employed. Throughout the present specification and claims a suitable pH is, when employing a compound comprising recurring moieties selected from sulfo and soluble salts thereof, a pH of from about 1.5 to about 12.5: when employing a compound comprising recurring moieties selected from carboxyl and soluble salts thereof a suitable pH is a pH in the range of from about 6.0 to about 12.5; all ranges inclusive.

Measurable and distinctive increases in viscosity over the sum of the viscosities of the starting substances are obtained when employing concentrations of the polymeric starting materials in water of suitable pH as low as one one-hundreth percent by weight of resulting solution. It is believed after examination of many aqueous preparations, that if techniques for the precise measurement of viscosity were more refined than are presently available, concentrations as low as one one-thousanth weight percent would be found to give measurable and distinctive increases in at least some of the properties collectively called the viscosity of the mixtures resulting from the combination thereof. Such concentrations of the product of the present invention are found to modify the properties of aqueous media perceptibility.

Other factors are found to have effect upon the viscosity of the resulting preparation. One such factor is the degree of polymerization, that is to say, the macromolecular weight, of the starting polymeric substances. Polymeric starting substances of relatively high molecular weight appear to be especially useful in proportion to total employed weight. Thus, when employing, as polymeric substance of the acidic type, the salt of polystyrene sulfonic acid prepared by neutralization of the sulfonic acid moieties, or most of them, good results and great thickening are obtained when employing a sodium polystyrene sulfonate having an average molecular weight of about one million or higher. Such starting polymer, in aqueous solution in a concentration of about 2 percent by weight of the resulting solution, readily takes part in the preparation of firm gels, although such aqueous starting solution is relatively thin and watery. Similarly, sodium polystyrene sulfonate solutions of similar concentration prepared from a starting polymer salt of which the average molecular weight is about 800,000 also give rise to very firm vehicles. By the employment of lower concentrations or polymer of lower molecular weight, or both, it is possible to prepare vehicles having lower viscosity.

Average molecular weights of the pyrrolidinone polymeric substance are desirably of at least the same general order, and, advantageously, higher. In terms of the K-value of Fikentscher, good results are obtained when employing polymers having K-values of from 30 to 90, and a molecular weight, by light scattering, of $1.5 \cdot 10^4$ or more. Higher K-values and molecular weights are advantageous. No upper limit molecular weight has been found to be critical so long as the polymer remains soluble. A lower limit molecular weight will depend upon the desired ratio of total dissolved solids to desired viscosity increase.

In one embodiment of the present invention, the viscosity-building action and preparation of a vehicle according to the present invention is carried out in situ by separately applying, to the desired site, the necessary starting substances.

The following examples serve to illustrate certain methods of preparation, products and the processes embodying, and utilities employing the present invention, but are not to be considered as limiting.

*Example I*

A sodium styrene-p-sulfonate monomer is polymerized in known manner to obtain a relatively pure sodium polystyrene-p-sulfonate having a mean molecular weight of approximately 800,000 as determined by a standard light-scattering method. This polymer is dissolved in water to prepare a colorless, practically neutral slightly viscous solution containing 2.5 percent of polymeric material by weight of total solution. For convenience, this solution will in the present example be referred to as the sulfonate solution.

An N-vinylpyrrolidinone polymer of which the molecular weight may be characterized by the K-value of about 90.0 according to the method of Fikentscher (see Cellulosechemie 13, 60 (1932)), as a fine powder, is dissolved in water to prepare an essentially neutral solution containing 2.5 percent of the said polymeric N-vinylpyrrolidinone compound. This solution will hereinafter, for convenience, be referred to as the pyrrolidinone solution.

Equal volumes of the sulfonate solution and the pyrrolidinone solution are contacted together quickly, with stirring at room temperature to prepare a thickened vehicle of the present invention. The mixture promptly assumes a viscosity very much higher than the viscosity of either starting solution, becoming a soft semi-solid.

The viscous mixture is disposed in the open filler ("bottom") end of an empty flexible dispensing tube which is then closed and sealed. The head of the tube, comprising a threaded neck to which a screw cap is affixed is exposed by unscrewing and removing the said cap and puncturing the head membrane. Through the puncture thus provided, the viscous product is readily expressed and applied as a viscous solid to surfaces upon which it is desired to effect such application. Upon being spread by application of pressure of an index finger the viscous vehicle forms an intact film or fluid membrane which appears to be uniformly continuous. Such film exhibits no tendency to flow, drip, or run under direct application or pressure intended to displace it; the film is strongly adhesive.

*Example II*

In the present example an aqueous solution of sodium polystyrene sulfonate is prepared identical with that employed in Example I. As the N-vinylpyrrolidinone polymeric aqueous solution there is employed an adduct of a biologically active material prepared as follows: an N-vinylpyrrolidinone polymer having a molecular weight characterized by its K-value according to Fikentscher of about 90 is dissolved in a solution of 4 grams of iodine in a mixture of 20 milliliters methylene chloride and 500 milliliters of carbon tetrachloride. The resulting dispersion is agitated at room temperature for 18 hours and thereafter the solid component is removed by filtration and washed repeatedly with carbon tetrachloride and with diethylether and then maintained at a temperature of 40° C. under sub-atmospheric pressure for approximately 18 hours to remove traces of solvent and achieve equilibrium dispersion of the halogen. The resulting solid adduct substance contains a substantial proportion of bound iodine. It is dissolved in water to prepare a nearly neutral solution containing 2.5 percent of the halogen-polymer adduct substance by weight of resulting aqueous solution. For convenience, this solution will, in the present example, be identified as the iodine-polymer solution. Equal volumes of the sulfonate solution and the iodine-polymer solution are intimately mixed and blended together with stirring at room temperature. The mixture promptly becomes homogeneous and of a viscosity very much higher than the viscosity of either starting solution, achieving a viscosity apparently as great as that described for the product of Example I.

The viscous mixture is placed in the open end of an empty flexible dispensing tube in the same manner as the product of Example I. The tube is then closed and sealed and in procedures such as were outlined in Example I, the resulting viscous iodine-bearing solution is applied to localized areas of human skin. Upon being spread by the application of pressure of a forefinger, the viscous iodine-vehicle material forms an intact film or fluid membrane of uniform and continuous nature having no observable tendency to flow, drip or run. It is not completely removed by the direct application of finger pressure intended to try to remove it. The product prepared in this example contains about 0.125 percent of iodine in total formulation corresponding to 5 percent iodine by weight of total solids. The product is found to be strongly germicidal.

*Example III*

The present example is carried out in all respects as is Example II except that the employed aqueous solutions of the starting polymeric substances contain 1 percent by weight of resulting solution of each of the polymeric materials. Each of the said polymeric starting solutions has a viscosity only slightly higher than that of water. However, the vehicle resulting when the said solutions are combined is of the viscosity of a thick salve. When introduced into and dispensed from a plastic dispensing tube in the manner hereinbefore described, this product, applied to and spread over a surface area with the resulting formation of a film, has no observable tendency to run, drip or flow.

*Example IV*

The present example is carried out in all respects as is Example I except that, instead of a sodium polystyrene sulfonate solution there is employed an ammonium polystyrene sulfonate solution containing approximately 14 percent ammonia in uncombined form in the resulting aqueous solution. This may be understood to be a 2.5 weight percent solution of ammonium polystyrene sulfonate in aqueous ammonia. The solution is strongly alkaline. A portion of such starting solution is set aside for comparison purposes. A further portion is combined with an equal volume of polyvinyl pyrrolidinone solution as hereinbefore described. Upon the combining of the polymeric sulfonate and pyrrolidinone solutions, thickening promptly takes place with the result that there is prepared an extremely viscous, semi-solid, gel preparation of ammonia water. A portion of such solid is set aside for comparison with the aforementioned sample of the ammonium polystyrene sulfonate solution in aqueous ammonia. The preparations are covered and maintained at room temperature and periodically tested for escape of ammonia and for remaining ammonia content. At the end of 72 hours, the simple ammonium polystyrene sulfonate solution in aqueous ammonia is found to have lost most of its ammonia content. In contrast, the thickened ammonia gel of the present invention is found, at the end of 72 hours, to have a content of ammonia not much less than the starting concentration. The gelled ammonia product of the present example is useful in application wherein aqueous ammonia is called for, with the improvement that the present composition may be handled as a near-solid.

A similar preparation is prepared comprising aqueous ammonia in 5 percent concentration; and is found to be similarly stable.

*Example V*

In manner essentially similar to the foregoing example there is prepared a gel comprising aqueous sodium polystyrene sulfonate and aqueous polymeric N-vinylpyrrolidinone together with 1 percent by weight of resulting product of soduim hydroxide. The resulting viscous material is strongly alkaline, and is adapted to be employed as a cosmetic adjuvant for topical application to human fingernails for the softening of cuticle preparatory to its cosmetic removal.

*Example VI*

A hose comprising two parallel laterally joined flexible tubes is provided with a nozzle whereby the contents of the tubes are intimately contacted together at the last instant of their traverse of the tubing and prior to issuing from the said nozzle. Through one tube is supplied a one weight percent aqueous solution of sodium polystyrene sulfonate and through the other tube is supplied an aqueous solution of a water-soluble polymeric alkenyl-substituted pyrrolidinone, in the present example an aqueous one weight percent N-vinylpyrrolidinone. Each of the two liquid supplies, of very low viscosity, contains as opacifier, a small amount of titanium dioxide. The solutions flow freely through their respective tubes; upon mixing in the said nozzle, the resulting composite solution promptly assumes the greatly increased viscosity characteristic of the products of the present invention, being in effect, water of greatly increased viscosity and adhesivity. The liquid issuing from the said nozzle is directed at a fire which is destroying a wooden structure. The resulting viscous, opacified water material readily adheres to the wooden structure and tends to build up a cooling, reflective deposit of substantial depth. As a result of these operations, the fire is not only superficially extinguished; but confined, superheated areas of combustible substances are cooled by the resulting deposit of gelled water substance assisted by the presence of the opacifier, thus obviating the need, often noted in professional extinction of damaging fires, to continue to cause a flowing stream of water to contact the remaining portions of the wooden structure. Thus the present product is of special value in fire fighting with restricted water supplies, or where flooding from excessive use of water is to be avoided.

In another embodiment of the instant aspect of the present invention, the said nozzle is provided with means for the introduction into the polymer solution stream, subsequent to the mixing of the said solutions, of compressed gas. In the instant example the gas is compressed carbon dioxide. The judicious selection of rate of gas introduction with respect to viscosity of the resulting product makes possible the production of a foam comprising the present galled water substance with abundant included bubbles of inert gas.

*Example VII*

There is provided a herbicidal solution containing, as a principal active ingredient, the alkanolamine salts of the ethanol and isopropanol series of 2,4-dinitro-o-secondary butylphenol. To the aqueous solution of said herbicidal substance there is added one percent by weight of resulting solution of polymeric N-vinylpyrrolidinone, the said polymer having a molecular aggregation as represented by the K-number according to Fikentscher of 90.

There is provided a second solution comprising one and one-half percent by weight of resulting solution of sodium polystyrene sulfonate. Each of the said solutions is placed in a separate tank in a sprayer designed to apply compressed air pressure to the contents of both tanks simultaneously, means for the control of the issue of each such liquid from its container, and a nozzle wherein the two solutions are mixed together at the last instant before leaving the said apparatus.

Compressed air pressure is applied, the nozzle is directed toward vegetation which it is desired to kill, and the control means are operated to permit the two solutions to issue from their containers, mixing at the last instant while yet remaining in the equipment, to prepare a heavy, yellow, clinging, viscous aqueous dispersion of the said herbicide in a gelled preparation according to the present invention. The resulting viscous substance clings to the above-ground parts of the plants upon which the preparation is caused to be deposited. As a result of these operations, there is applied a deposit of herbicidal toxicant having effect upon the plant of longer persistence and, on an average of a large number of plants, more nearly complete kill.

In a related process, separate solutions of 0.1 weight percent of the two gelling substances are employed, and the herbicide is an ester of 2,4-dichlorophenoxyacetic acid. The viscosity increase is achieved prior to application. The resulting syrupy liquid preparation has a viscosity of about 1000 centipoises, Brookfield.

The viscous preparation is readily applied to a test area from a compressed air sprayer. The applied substance is virtually free from air-borne random particles and thus does not cause "drift" injury to adjacent areas.

Similar results but giving a product of moderately lower viscosity are obtained when the procedures are repeated employing the same materials except that the employed vinylpyrrolidinone polymer has a K-value of about 30.

*Example VIII*

In a Soil Conservation District comprising approximately 600,000 acres disposed over the head-waters of a small stream there are, as principal watershed of such stream, 12 farms upon the land of each of which there is a catchment. The said catchments are used by the operators of the said farms as ponds for watering live stock, for recreational swimming and fishing, and for other uses. In seasons of acute rainfall, the catchments customarily fill to overflow and by their subsequent confluence contribute, to the small stream about whose head waters they are disposed, water in volume greater than lower reaches of the bed of the stream can readily accommodate; with the result that portions of the stream and its environs are subject to sudden, brief, damaging floods.

Into each of six of the said catchments there is introduced sodium polystyrene sulfonate. Into each of the remaining six there is introduced N-vinylpyrrolidinone. The said substances are introduced into the catchments at rates corresponding to approximately one tenth of one percent by weight of water. No individual catchment is seriously affected by the introduction of one of the relatively inert substances in small amounts. However, upon the occurrence of a short, sharp rainfall as the catchments overflow and their waters flow together and commingle in the said small stream, the resulting mixed solution of the two substances becomes of greatly increased viscosity with the result that, while it flows through the stream bed, such flow is of greatly reduced rate, and flooding does not occur. As the rainfall continues, and further flow of water takes place, the water of increased viscosity is greatly diluted and carried downstream so that, a few miles below the site where the said confluence occurs, no further evidence of the preventive means appears.

Example IX

A polymeric N-vinylpyrrolidinone having a K-value according to Fikentscher of 30 is dissolved in water to obtain a colorless solution thereof containing 5 percent by weight of resulting solution of the said polymer.

A second solution was prepared, comprising a copolymer of vinyl acetate and maleic acid at a pH of about 6, to which it was adjusted by careful addition of sodium hydroxide to the originally acid aqueous material.

Equal portions of 5 weight percent solutions of the copolymer of vinyl acetate and maleic anhydride and the polymeric vinylpyrrolidinone in water are mixed together. The resulting mixed solution, comprising 2.5 weight percent of total resulting solution of each of said components is immediately intimately mixed and stirred. Thereupon, the viscosity of the resulting mixture promptly increases. The resulting viscosity is found to be approximately five times the sum of the viscosities of the separate compounds.

Example X

A 1 percent aqueous solution of polymeric N-vinylpyrrolidinone is intimately mixed and blended with a 1 percent aqueous solution of a commercial flocculant which is a polyacrylamide partially hydrolized after polymerization to obtain a substantial fraction of acidic and saline moieties on the polymer chain. The second said aqueous solution is adjusted to a pH of about 6.5. The two said solutions are combined with mixing and stirring and promptly thereupon the resulting mixture undergoes a great increase in viscosity.

Example XI

Two aqueous 1 percent by weight solutions are prepared, one containing polymeric N-vinylpyrrolidinone having a K-value according to Fikentscher of 90. The other contains a copolymer of styrene and maleic anhydride hydrolyzed subsequent to polymerization to obtain a polymer upon which there are recurring carboxyl radicals attached to the hydrocarbon chain. The resulting hydrolyzed polymer is thereafter neutralized with sodium hydroxide to obtain a sodium salt of the carboxyl groups. Each of the separate solutions is colorless, bland, of pH approximately 7, and of a viscosity not apparently much greater than that of water.

The two solutions are combined with immediate mixing and stirring, and promptly thereupon the resulting mixture increases in viscosity to become a firm gel.

Example XII

Two aqueous 1 weight percent solutions are prepared. One of the said solutions contains polymeric N-vinylpyrrolidinone having a K-value according to Fikentscher of approximately 90. The other contains a commercial polymeric material, essentially a polymer of styrene sulfonated subsequent to polymerization to introduce thereinto, primarily upon the aromatic nuclei thereof, sulfonate groups corresponding in number to approximately 70 percent of the aromatic nuclei. The resulting substance is strongly acidic and is of limited solubility in water. Each of the said solutions is colorless, and of a viscosity apparently only slightly greater than that of water.

The two solutions are mixed and quickly stirred together, whereupon there promptly forms a very viscous gel.

Example XIII

A viscous product according to Example I is prepared, spread in a thin layer on a glass surface, and placed in a vacuum oven wherein it is exposed for a period of time to a temperature of approximately 40° C. and gradually declining subatmospheric pressures. The said pressure and temperature conditions are maintained for a period of time to vaporize and remove water from the said vehicle substance. The resulting dry material is scraped from the surface whereupon it is dried, and, by simple crushing reduced to an amorphous irregular powdered material. This powdered material is then placed in a capped glass container and held in storage for a period of several months.

At the end of this time, the substance is removed from its container, dispersed in water of amount approximately equal to the amount originally employed in preparation of the product. As a result of these operations there is obtained a reconstituted viscous material, the viscosity of which is nearly as great as the original viscosity of the vehicle prepared prior to drying.

The resulting reconstituted viscous material is thereafter again dried and again reduced to a white solid which is subsequently powdered and again placed in storage. After several weeks in such storage the powdered material is again reconstituted with essentially the same amount of water and upon examination is found to possess viscosity much greater than the original viscosity of the separate starting polymeric solutions from which the original product is prepared, but somewhat lower than that of the gel prior to its first dehydration.

Example XIV

A viscous material similar to the product of Example I is prepared. The resulting gel is sufficiently firm that it does not flow from a container confining it, when the container is inverted.

The resulting gel is placed in the container of a high speed impeller-type mixing device ("Waring Blendor") and subjected to high-speed shear mixing. The speed of the impeller is greatly reduced as compared with its speed when operating in water. Continued operation of the impeller results in a gradual decline in the viscosity of the viscous preparation. After 5 minutes of operation, the temperature of the viscous preparation thus agitated is noted, and is found to have risen, as a result of the mixing and blending action, from an initial temperature of approximately 22° C. to a temperature of approximately 80° C. This is interpreted as a manifestation of the inner resistance of the viscous material to the shearing action of the mixing device. The viscosity of the material increases as the temperature of the product declines to room temperature.

Example XV

Equal weights of polymeric N-vinylpyrrolidinone and sodium polystyrene sulfonate of the sort employed in Example I are mixed and blended together dry. The resulting dry mixture is thereafter taken up in water to obtain an approximately 1 weight percent solution of each of the said starting materials. Immediately upon the combining of the dry mixture with water, there results an increase in viscosity, and the preparation of a material much more viscous then would have been an aqueous solution of either starting material alone.

The viscous preparation is placed in storage and held therein for 18 hours. At the end of this time, the preparation is examined and found to be of viscosity substantially lower than that of the same preparation at the end of its initial viscosity increase.

*Example XVI*

Polymeric N-vinylpyrrolidinone having a macromolecular weight corresponding to a K-value of Fikentscher of 90.0 is dissolved in natural seawater representative of the waters of the high seas to prepare a solution containing 1 percent of the said polymeric substance by weight of resulting seawater solution. Similarly, a solution is prepared comprising 1 percent of sodium polystyrene sulfonate by weight of resulting sea-water solution. The two solutions, at room temperature (approximately 24° C.) are then poured together and intimately mixed by manual stirring. The resulting mixture promptly increases in viscosity, the viscosity increasing as stirring is continued for a period of a few minutes.

*Example XVII*

The present example is similar to the foregoing in that the aqueous medium employed is sea water, and the polymeric starting materials are the same, but the preparation is carried out in a different manner.

Equal weights of sodium polystyrene sulfonate having a molecular weight of approximately 150,000 and polymeric N-vinylpyrrolidinone having a macromolecular weight corresponding to a K-value of Fikentscher of about 90.0 are intimately mixed and blended together and thereafter, in the dry form, placed together in a ball mill where they are commingled for a period of about 5 hours to reduce the resulting product to a fine powder and provide intimate mixing of the starting polymeric substances.

The resulting impalpable powder is strewed gently on the upper surface of a body of sea water. Coarser particles of the powdered material promptly break through the surface tension of the water and thereafter settle through the water towards the bottom. All the particles, including those settling, appear to disperse in the water to prepare a heavy viscous jelly-like substance in the form of an aqueous dispersion of the said starting materials. Settling particles of the said mixed powdered material appear to disperse in the water with the resulting formation of gel as they settle, producing descending threads or pendant structures of such gel in otherwise unaffected portions of sea-water beneath a surface gelled zone.

The resulting aqueous preparation is not stirred, a deliberate effort being made to observe the spontaneous behavior of the said solid substance in sea water.

Examination of the walls and bottom of the vessel within which the said sea water is confined, discloses the presence, as a more-or-less continuous lining of said walls and a more-or-less continuous layer across said bottom of a dense viscous preparation according to the present invention, such viscous preparation thus comprising nearly an intact cell containing relatively unaffected sea water.

The amount of such powdered solution employed in the present example is not measured precisely, but is approximately equal to one-quarter weight percent of sea water thus treated.

*Example XVIII*

Approximately neutral solutions of polymeric N-vinylpyrrolidinone having a Kikentscher K-value of 90 and of sodium polystyrenesulfonate having a mean molecular weight of approximately 1,500,000 are prepared in various concentrations and combined to determine the viscosity change resulting when employing such solutions containing relatively low concentrations of solutes. The results are as indicated in the following table:

BROOKFIELD VISCOSITIES IN CENTIPOISES OF VARIOUS POLYMER-POLYMER THICKENED AQUEOUS SUBSTANCES

[Equal amounts of each polymer solution employed in each instance]

| Concentration of Polymeric N-Vinyl-Pyrrolidinone, per cent | Concentration of Sodium Polystyrene Sulfonate, per cent | Brookfield Spindle | R.p.m. of Test | Viscosity in Centipoises |
|---|---|---|---|---|
| 1 | 1 | 3 | 6 | 2,000 |
| 0.25 | 0.25 | 2 | 6 | 1,200 |
| 0.25 | 0.25 | 13 | 6 | 1.200 |
| 0.05 | 0.05 | 2 | 6 | 475 |
| 0.025 | 0.025 | 2 | 6 | 165 |
| 0.001 | 0.001 | 1 | 6 | above 28 |

[1] This test repeats the one just preceding except that a different spindle is employed in measuring the viscosity readings thus attained. As noted, they are identical.

The final entry in the table indicates a value above 28 centipoises. The viscosimeter reading is 28, but the rotating spindle characteristic of this type of viscosimeter is not wholly covered by the solution under test; hence the reading is low. It is estimated that the actual value lies between 30 and 35.

From this test it is concluded that there is no critical lower limit concentration beyond which the phenomena of the products of the present invention fail to occur, in at least some degree.

The compositions and products of the present invention comprising recurring sulfonic acid moieties and salts thereof are used successfully to increase the viscosity of strong mineral acids as is indicated in the following examples.

*Example XIX*

Dry granular sodium polystyrene sulfonate is dispersed in liquid concentrated sulfuric acid. After prolonged stirring it is determined that the substance is incompletely soluble in the said acid. Therefore, with necessary precautions in view of the unusual procedure, a small amount of water is added drop-wise and with continuous stirring to the dispersion of sodium polystyrene sulfonate in sulfuric acid, employing only enough water to permit dissolving the said sulfonate compound. The precise acid concentration at which the sulfonate entirely dissolves is not ascertained but is roughly estimated to be between 60 and 75 percent $H_2SO_4$. In similar procedure a solution of N-vinylpyrrolidinone in sulfuric acid is prepared. Each of the said solutions is of a viscosity determined principally by the concentration of sulfuric acid, is fluid and easily poured, but moderately thicker than water.

The two separate sulfuric acid solutions are then combined with mixing and stirring. The viscosity of the resulting preparations promptly increases, such increase continuing over a period of time until the resulting preparation is a soft, deformable solid which can be lifted bodily, on the employed glass stirring rod, from the container in which the mixing is carried out. The product is tested and found to be active as an acid in the same degree as a corresponding aqueous sulfuric acid except that, because internal flow is obstructed, surficial portions of the acid first become exhausted and thereafter it is necessary to deform the body comprising the acid to render further portions of acid available.

*Example XX*

The present example is carried out in all respects as is Example XIX, foregoing, except that the employed acid is phosphoric acid. The results obtained are essentially the same, the resulting preparation being of viscosity so great that it can be lifted bodily on a stirring rod.

The utilities of the novel viscosity-building substances of the present invention are in part set forth hereinbefore. The present invention is found to have many other uses. Among these are the increasing of the viscosity with corollary reduction of vapor pressure of aqueous ammonia solutions which are thereby rendered useful for airplane application as fertilizers of the soil for agricultural purposes. The use of aqueous ammonia in this way is well known but its airplane application has been impractical because the ammonia escapes as a gas from its aqueous solutions when such solutions are sprayed or otherwise ejected from an airplane into the air above a field to which application is desired. A thickened aqueous product which may be ejected in droplets or as solid fragments overcomes this difficulty. The preparation is deemed to be especially appropriate in the application of ammonia as fertilizer to fallow ground or to shallow water in which aquatic or semi-aquatic vegetation such as rice, is to be grown.

Also, a thickened aqueous ammonia of which the viscosity is increased to any desired level has numerous household and industrial applications as a cleansing agent. The adhering of the thickened preparation to the surface to be cleansed is greatly helped by the preparation of the present invention.

Similarly, sulfuric, phosphoric, and acetic acids which are widely used in industry as "pickling" or metal-surface-cleansing agents may be thickened in the manner of the present invention to viscosity of any desired degree thereby considerably enhancing their usefulness in many cleansing applications.

Such toilet articles as after-shave lotion, cologne water, perfumes, shampoo liquids and the like having appreciable content of lower alkanols, glycols, glycerine and the like, may be given increased viscosity with resulting increased adherence to surfaces to which they are applied in the manner of the present invention.

The aqueous slurries of natural earths employed in the well-drilling art, particularly the oil-well drilling art, may be caused to have increased viscosity and resulting increased usefulness by the preparations of the present invention.

In the industrial production of surfactant substances in bar form for domestic use, one problem has consistently been the tendency of such bars comprising synthetic detergents, when in contact with water, to swell, disperse, and "slough off." Another problem has been that detergent bars, while effective as sources of cleansing detergents, do not exhibit the lubricity when moist, that is to say the "slipperiness," which is commonly associated with the power to cleanse. Both these problems are simultaneously overcome by the inclusion, in a detergent bar, of a viscosity-increasing composition of the present invention. Meantime, such preparation does not interfere with the desired detergent action of such substance.

Numerous aqueous window-cleaning preparations are on the market. These preparations uniformly suffer the disadvantage that when it is desired to apply a quantity thereof sufficient to soften and remove substantial accumulations of soil from glass or window surfaces, the aqueous preparation runs off in the manner of liquids. These preparations, thickened in the manner of the present invention do not run off. Moreover, the present viscosity building agents do not interfere with the cleansing action of such substances but rather appear to contribute to the resulting brilliance and clarity of the cleansed surface.

In another application, one of the present aqueous starting materials may be applied to one of two surfaces which are to be joined; the other may be applied to the second such surface. The surfaces are then brought together with gentle pressure, whereby the present viscous materials form and the surfaces are caused thereby to adhere together.

I claim:

1. Composition of matter comprising concentrated sulfuric acid, sodium polystyrene sulfonate, and a polymer comprising recurring N-vinylpyrrolidinone moieties together with a minor content of water, such composition being characterized by having a viscosity greater than the viscosity of any of its starting materials.

2. Composition according to claim 1 except that the employed concentrated acid is phosphoric acid.

3. In a method of the control of a flood that would, if not controlled, result from the confluence of more than one flowing, natural body of water, the steps of introducing into separate portions of at least one such natural body of water a first solution comprising a water-soluble polymer comprising an N-vinylpyrrolidinone and into at least a second one such body of water a second solution comprising a polyalkenyl substance comprising recurring acidic moieties selected from sulfo and carboxyl and the salts thereof, at a pH of from about 6 to about 9.

References Cited

UNITED STATES PATENTS

| | | | |
|---|---|---|---|
| 2,558,167 | 6/1951 | Beghin et al. | 252—136 |
| 2,723,248 | 11/1955 | Wright | 260—895 |
| 2,901,457 | 8/1959 | Stoner | 260—8 |
| 2,961,431 | 11/1960 | Kutner | 260—29.6 |
| 3,048,550 | 8/1962 | Roth | 260—29.6 |

FOREIGN PATENTS

| | | |
|---|---|---|
| 836,831 | 9/1960 | Great Britain. |

MURRAY TILLMAN, *Primary Examiner.*

LEON J. BERCOVITZ, *Examiner.*

J. NORRIS, W. J. BRIGGS, *Assistant Examiners.*